Figure 1:
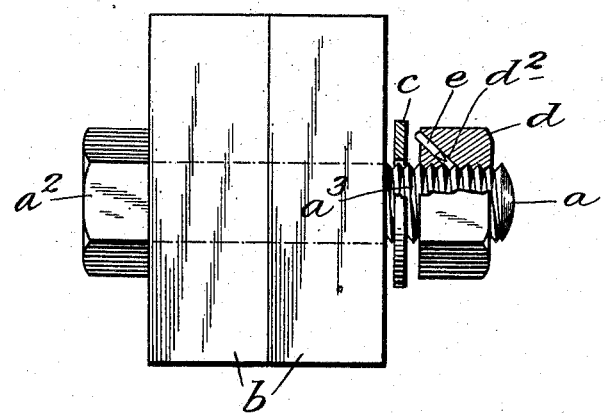

W. FARMAN.
NUT LOCK.
APPLICATION FILED MAY 17, 1910.

981,180.

Patented Jan. 10, 1911.

WITNESSES:
A. R. Appleman
B. M. Byerson

INVENTOR.
William Farman
BY Edgar Tate & Co.
ATTORNEYS.

UNITED STATES PATENT OFFICE.

WILLIAM FARMAN, OF NEW YORK, N. Y.

NUT-LOCK.

981,180.  Specification of Letters Patent.  Patented Jan. 10, 1911.

Application filed May 17, 1910. Serial No. 561,840.

*To all whom it may concern:*

Be it known that I, WILLIAM FARMAN, a citizen of the United States, and residing at New York, in the county of New York and State of New York, have invented certain new and useful Improvements in Nut-Locks, of which the following is a specification, such as will enable those skilled in the art to which it appertains to make and use the same.

This invention relates to nut locks, and the object thereof is to provide an improved device of this class which is simple in construction and operation and well adapted to accomplish the result for which it is intended.

The invention is fully disclosed in the following specification, of which the accompanying drawing forms a part, in which the separate parts of my improvement are designated by suitable reference characters in each of the views, and in which:—

Figure 2:
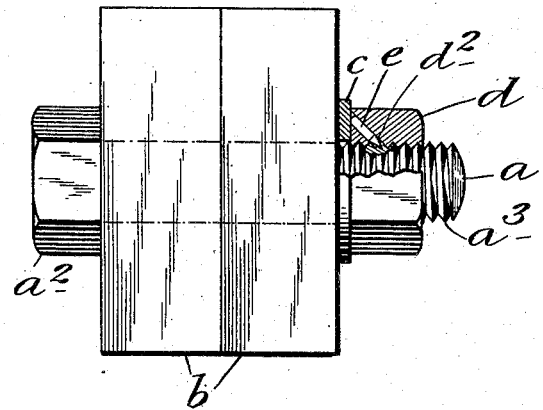

Figure 1 is a view showing a working piece, a bolt passing therethrough, and a nut and washer mounted on said bolt, said nut and washer being shown partially in section and said nut being provided with my improved locking device, and;—Fig. 2 a view similar to Fig. 1 but showing the parts in a different position.

In the drawing forming part of this specification I have shown at $a$ a bolt provided at one end with a head $a^2$, and the opposite end of which is threaded in the usual manner as shown at $a^3$, and this bolt is shown as passed through a block or blocks of material $b$ and mounted on the threaded portion thereof is a washer $c$ and nut $d$.

In the practice of my invention I form in the inner side portion of the nut a radial and outwardly inclined bore or passage $d^2$ which opens inwardly, centrally of the inner threaded bore or passage through the nut and outwardly through the inner face of the nut adjacent to one edge thereof, and in said bore or passage is placed a movable steel pin $e$, the inner end of which is pointed and said pin is slightly longer than said bore or passage and when forced inwardly the pointed end thereof cuts into one side wall of one of the threads on the bolt $a$.

In the form of construction shown, when the nut $d$ is screwed fully home as shown in Fig. 2 the washer $c$ bears on the block or blocks $b$ and on the outer end of the pin $e$ and forces said pin inwardly and the pointed end thereof cuts into the bolt or one of the threads thereof as above described, and this prevents the accidental working loose of said nut or the accidental removal of the nut from said bolt, or any removal of said nut from said bolt without the application of great power which may be applied when desired by a wrench.

If the block or blocks $b$ or other work piece or material be composed of metal the washer $c$ would not be necessary and said washer therefore forms no essential part of my invention, but if said block or blocks or the material through which the bolt is passed be composed of wood then the washer $c$ will be necessary.

Having fully described my invention, what I claim as new, and desire to secure by Letters Patent, is:—

1. A nut, the inner side portion of which is provided with a radial and inclined bore or passage in which is placed a movable pin, the inner end of which is pointed, said pin being slightly longer than said bore or passage.

2. The combination with a threaded bolt, of a nut the inner side portion of which is provided with a radial and inclined bore or passage, the inner end of which opens inwardly through the threaded bore of said nut and the outer end of which opens outwardly through the inner side face of said nut and adjacent to the outer edge thereof, and a movable pin placed in said bore or passage, and the inner end of which is pointed, said pin being slightly longer than said bore or passage.

3. A threaded bolt provided with a threaded nut, said nut being provided in its inner side portion with a radial and inclined bore or passage which opens inwardly into the central bore of said nut and outwardly through the inner face thereof and a movable pin placed in said bore or passage, and the inner end of which is pointed.

In testimony that I claim the foregoing as my invention I have signed my name in presence of the subscribing witnesses this 14th day of May 1910.

WILLIAM FARMAN.

Witnesses:
 B. M. RYERSON,
 C. E. MULREANY.